(12) United States Patent
Koyanagi et al.

(10) Patent No.: US 6,412,866 B2
(45) Date of Patent: Jul. 2, 2002

(54) CHILD SEAT

(75) Inventors: Toshiro Koyanagi; Noriyuki Kosugi, both of Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/789,721

(22) Filed: Feb. 22, 2001

(30) Foreign Application Priority Data

Feb. 29, 2000 (JP) .......................................... 2000-053982
Jan. 30, 2001 (JP) .......................................... 2001-021968

(51) Int. Cl.$^7$ ................................................. B60N 2/28
(52) U.S. Cl. ..................................... 297/250.1; 297/468
(58) Field of Search .......................... 297/250.1, 487, 297/488, 468

(56) References Cited

U.S. PATENT DOCUMENTS 5,303,979 A * 4/1994 Koyanagi et al. ........ 297/250.1
5,685,604 A * 11/1997 Kain ........................ 297/250.1
6,106,057 A * 8/2000 Lee ........................... 297/250.1

FOREIGN PATENT DOCUMENTS

DE           92 18 775        10/1995

* cited by examiner

Primary Examiner—Peter Brown
(74) Attorney, Agent, or Firm—Kanesaka & Takeuchi (57) ABSTRACT

A child seat has side walls on left and right sides of a squab portion thereof, and recessed portions for a seat belt passage, respectively. In case of a relatively large-sized infant, a seat belt installed in a vehicle and designed primarily for use by an adult is placed to extend across the squab portion. The seat belt passes through the recessed portions so as to extend closely with the infant's body to protect the infant. In case of a relatively small-sized infant, an impact shield is attached to the seat belt, so that the infant can be protected by the seat belt via the impact shield. Fitting members are fitted in the recessed portions to make the tops of the side walls flat when using the impact shield. The impact shield is stably placed on the side walls having the flat tops.

10 Claims, 11 Drawing Sheets

CHILD SEAT

BACKGROUND OF THE INVENTION AND RELATED ART STATEMENT

The present invention relates to a child seat which is mounted on a vehicle seat, and more particularly, to a child seat such that a seat belt installed in a vehicle and designed primarily for use by an adult occupant is extended across a squab portion of the child seat for restraining an infant or a child.

Various types of child seats have been proposed which are mounted on a vehicle seat for protecting an infant or a child in the event of emergency, such as vehicle collision. As an example of the child seats, there is a type such that a child seat body is secured to a vehicle seat; an infant is seated on the child seat body; and a seat belt installed in a vehicle and designed primarily for use by an adult (hereinafter, sometimes referred to just as "seat belt") is placed to extend across the front of the child seat body with an infant thereon to hold the infant's body to the child seat, thereby protecting the infant from an impact.

This type of child seat normally has, on its child seat body, means for securing the child seat to a vehicle seat. The child seat body is secured to the vehicle seat by the securing means, and then an infant is seated on a squab portion of the child seat body. After that, a seat belt installed in the vehicle is placed to extend across the front of the child seat body and the infant seated on the squab portion of the child seat, and a tongue of the seat belt is then latched to a buckle fixed to the vehicle body.

When the body of the infant seated on the child seat is too small, the infant's body may not be sufficiently held to the child seat only by the seat belt extending across the front of the infant. In this case, an impact shield should be attached to a portion of the seat belt extending on the infant body so that the infant's body is held by the impact shield and the seat belt.

Infants are basically categorized in two groups according to the weight. One is a small size group having a weight from 9 kg to 18 kg (hereinafter, this group will be sometimes referred to as "first group"), and the other is a large size group having a weight from 15 kg to 25 kg (hereinafter, this group will be sometimes referred to as "second group").

Most of the child seats of the aforementioned types are structured such that, when a large-sized infant belonging to the second group is seated, only the seat belt is used to directly hold the infant's body to the child seat, and when a small-sized infant belonging to the first group is seated, the impact shield is attached to the seat belt and the infant's body is held to the child seat by both the impact shield and the seat belt.

In state that the child seat body is secured to the vehicle seat, an infant is seated on the squab portion of the child seat, and the seat belt is placed to extend across the front of the infant on the child seat, in the event of emergency, such as vehicle collision during running of the vehicle, a seat belt retractor connected one end of the seat belt and having a function of winding and withdrawing the seat belt is brought into a locked state (a reel of the seat belt retractor on which the seat belt is wound is stopped from rotating).

As a result, the seat belt is prevented from being withdrawn even though the infant's body moves forward due to the inertia force caused by the collision. Therefore, the infant's body can be held and the impact on the infant's body can be absorbed by the seat belt or the impact shield attached to the seat belt.

According to the child seat having the aforementioned structure, the infant's body can be held to the child seat, according to the size of the infant, directly by the seat belt of the vehicle or by both the seat belt and the impact shield attached to the seat belt. Therefore, the child seat can securely hold the infant's body of various sizes. This type of child seat has an advantage of not requiring a peculiar seat belt device built in the child seat body besides the seat belt installed in the vehicle body. This means that the structure is simple without loosing high reliability relative to the protective performance, thus offering a large advantage in view of cost.

In these child seats, as the impact shields to be attached to a seat belt, there are three types as follows.

An impact shield of a first type is structured such that it is attached to a seat belt, and is placed in front of an infant together with the seat belt. After that, the impact shield is positioned on the lap of the infant just like being carried by the infant (hereinafter, this type of impact shield will be sometimes referred to as "first type impact shield").

An impact shield of a second type has, on its right and left sides, side walls extending downward, and is structured such that it is attached to a seat belt, and is located in front of an infant together with the seat belt. After that, the impact shield is placed on a child seat to extend across the infant's body to be supported by the side walls thereof (hereinafter, this type of impact shield will be sometimes referred to as "second type impact shield").

An impact shield of a third type is designed to be placed on a child seat having side walls on the right and left sides of a squab portion thereof, on which the impact shield can be placed, and is structured such that it is attached to a seat belt, and is located in front of an infant together with the seat belt. After that, the impact shield is placed on the side walls of the child seat to extend between the side walls (hereinafter, this type of impact shield will be sometimes referred to as "third type impact shield").

In the child seat provided with the third type impact shield, when a large-sized infant is seated on the child seat and the seat belt is placed to extend across the child seat without the impact shield as mentioned above, the seat belt may be caught by the side walls disposed on the right and left sides of the squab portion, so that the seat belt can not closely contact the infant's body. This reduces the holding efficiency of the seat belt, so that the infant's body may not be sufficiently held to the child seat. To prevent this situation, there is a case such that the side walls are provided with recessed portions extending downwardly from the top surfaces, respectively. By passing the seat belt through the recessed portions, the seat belt is not caught by the side walls and is therefore securely disposed to closely contact the infant's body.

In the child seat provided with the first type impact shield, the impact shield is not substantially supported by the child seat body. Therefore, the stability of the impact shield after installation is extremely low, and the impact shield may sometimes provide stress and fatigue to the infant when the impact shield is used for a long period of time.

In the child seat provided with the second type impact shield, the impact shield is supported by the side walls disposed on its right and left sides, so that the stability of the impact shield after installation is high. Since the load by the weight of the impact shield and the like is not applied on the infant, the impact shield may not provide stress and fatigue to the infant even when the impact shield is used for a long period of time. However, the child seat provided with the impact shield of this type is not selected by the users according to its appearance because the child seat looks unattractive when the impact shield is used.

In the child seat provided with the third type impact shield, the impact shield is supported by the side walls disposed on the right and left sides of the squab portion, so that the stability of the impact shield after installation is high just like the second type impact shield. In addition, the child seat is favored with the users according to its appearance because the child seat looks attractive when the impact shield is used. As mentioned above, however, when a large-sized infant is seated on the child seat and the seat belt is placed to extend across the child seat without the impact shield as mentioned above, the seat belt is caught by the side walls disposed on the right and left sides of the squab portion, so that the seat belt is hardly arranged to closely contact the infant's body. This reduces the holding efficiency of the seat belt, so that the infant's body may not be sufficiently held to the child seat.

To prevent this situation, there is a case that the side walls are provided with recessed portions extending downwardly form the top surfaces, respectively. In this case, when it is used without the impact shield, portions of the seat belt lying on the side walls pass through the recessed portions, whereby the seat belt is not caught by the side walls and therefore closely contacts the infant's body, thereby securely holding the infant's body to the child seat. However, when the impact shield is attached to the seat belt and is placed on the side walls, a portion of the impact shield may fall into the recessed portions, to tilt the impact shield. That is, this case may lose the stability of the impact shield when it is installed.

This invention has been made in view of the above problems, and an object of the present invention is to provide a child seat of a type such that a seat belt is placed to extend across a squab portion of the child seat, wherein the child seat has a good appearance when an impact shield is installed and excellent stability of the impact shield after installation.

Another object of the invention is to provide a child seat as stated above, which can securely hold an infant even when the impact shield is not used and the seat belt is placed to extend across the child seat.

Further objects and advantages of the invention will be apparent from the following description of the invention.

SUMMARY OF THE INVENTION

A child seat of the present invention comprises a squab portion on which an infant is seated and side walls disposed on left and right sides of the squab portion, and the child seat is secured to a vehicle seat. In the child seat, the side walls are provided with recessed portions extending downwardly from the top surfaces, through which a seat belt installed in a vehicle and designed primarily for use by an adult passes. The child seat also includes fitting members for filling the recessed portions.

According to the child seat of the present invention, when, after a child seat body is secured to a vehicle seat and an infant is seated on the squab portion of the child seat body, the seat belt is placed to extend across the front of the child seat body and the infant's body, portions of the seat belt lying on the side walls pass through the recessed portions, whereby the seat belt can be prevented from extending away from the infant's body. Therefore, the seat belt can be introduced to closely contact the infant's body, thereby securely holding the infant's body to the child seat.

In the child seat of the present invention, the fitting members are fitted into the recessed portions so as to fill the recessed portions, making the tops of the side walls flat. When the infant's body is too small to be sufficiently held to the child seat only by the seat belt, an impact shield is attached to the seat belt, so that the infant's body can be held to the child seat by the impact shield and the seat belt. In this case, the fitting members are previously fitted in the recessed portions to make the tops of the side walls flat, thereby preventing the impact shield from partly falling into the recessed portions and thus preventing the impact shield from tilting. As a result, the child seat has a good appearance when the impact shield is installed to the child shield and the stability of the impact shield after installation can be improved.

According to the child seat of the present invention, it is preferable that the fitting members are detachably fitted in the recessed portions. This allows various using situations of the child seat to correspond to the size of the infant seated in the child seat, thereby suitably protecting infants of various sizes.

According to the child seat of the present invention, it is preferable that each fitting member is covered with a cover. The cover is normally made of the same material as a covering member of the child seat body, i.e. made of a fabric of polyester with a lining of urethane foam. The fitting member covered by the cover may be soft so as not to provide an unpleasant feeling to the infant when the infant touches the fitting member.

Moreover, it is preferable that the fitting members are provided with engaging means for connecting to the side walls. Accordingly, the fitting members are securely fixed by the engaging means when the fitting members are fitted in the recessed portions.

DETAILED DESCRIPTION OF PREFERRED EMBODIMENTS

Figure 1:
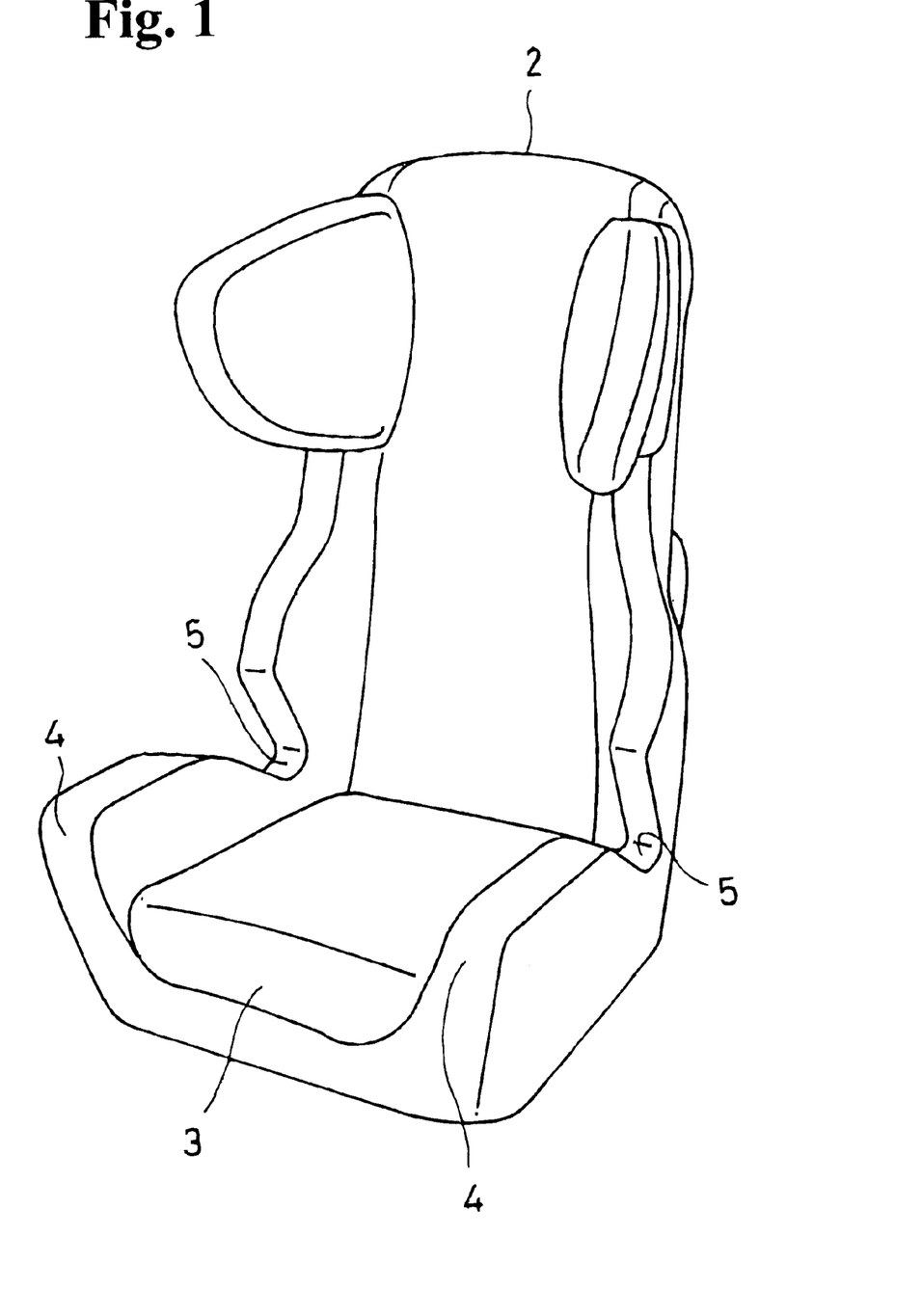
FIG. 1 is a perspective view of a child seat body of a child seat-according to an embodiment of the present invention.
Figure 2:
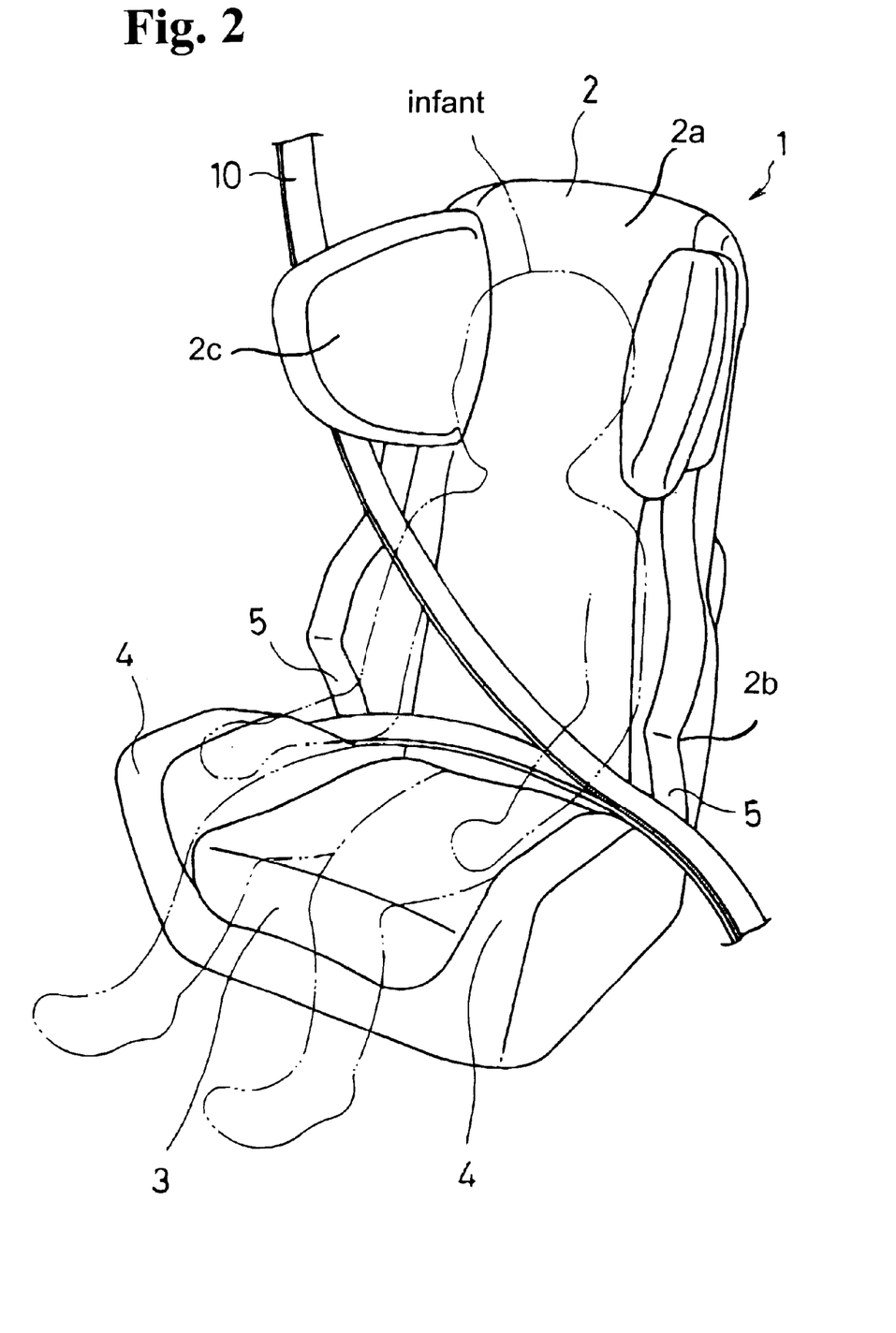
FIG. 2 is a perspective view showing the child seat according to the embodiment in one using situation.
Figure 3:
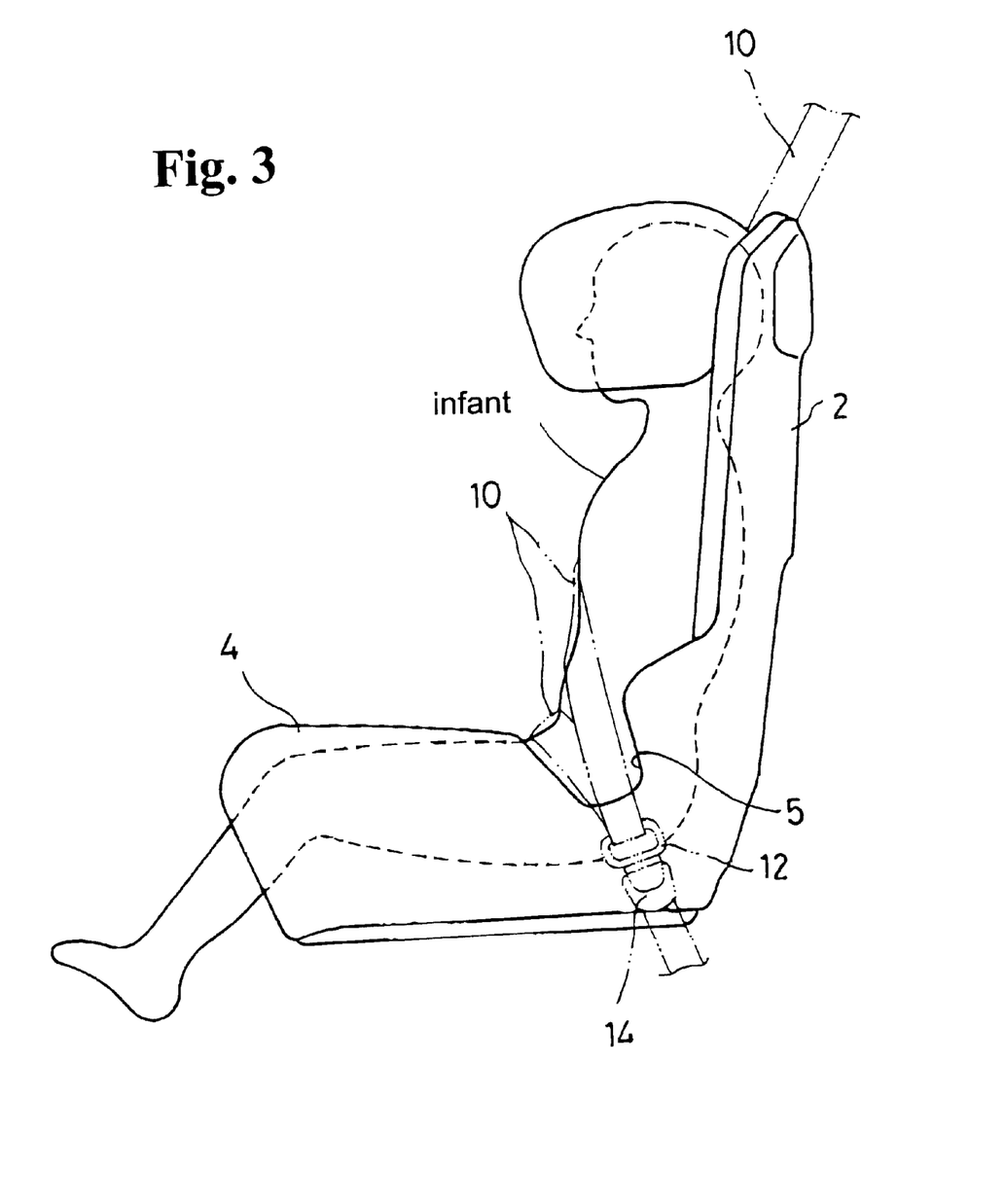
FIG. 3 is a side view of the child seat shown in FIG. 2.
Figure 4:
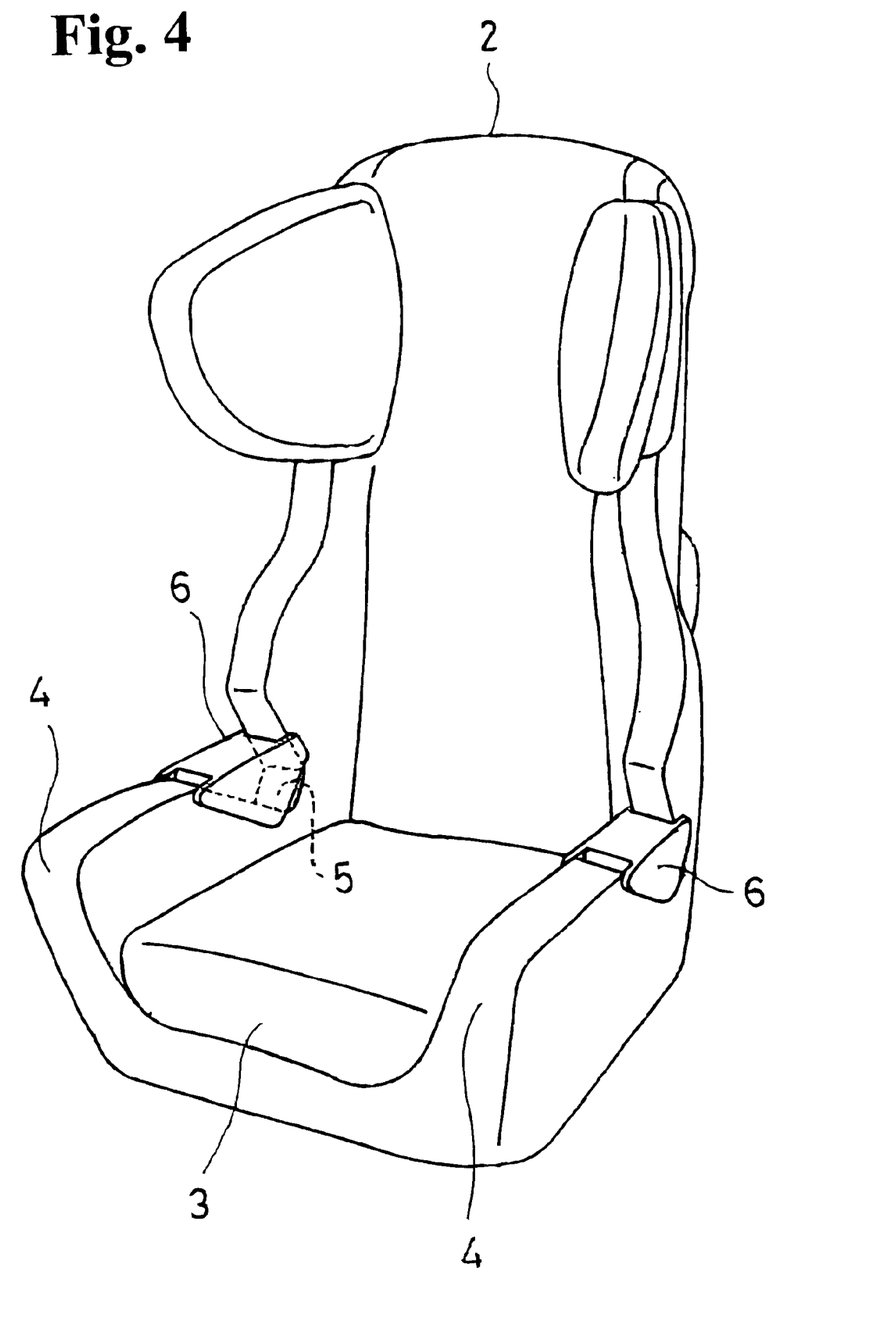
FIG. 4 is a perspective view showing the child seat body to which fitting members are installed.
Figure 5:
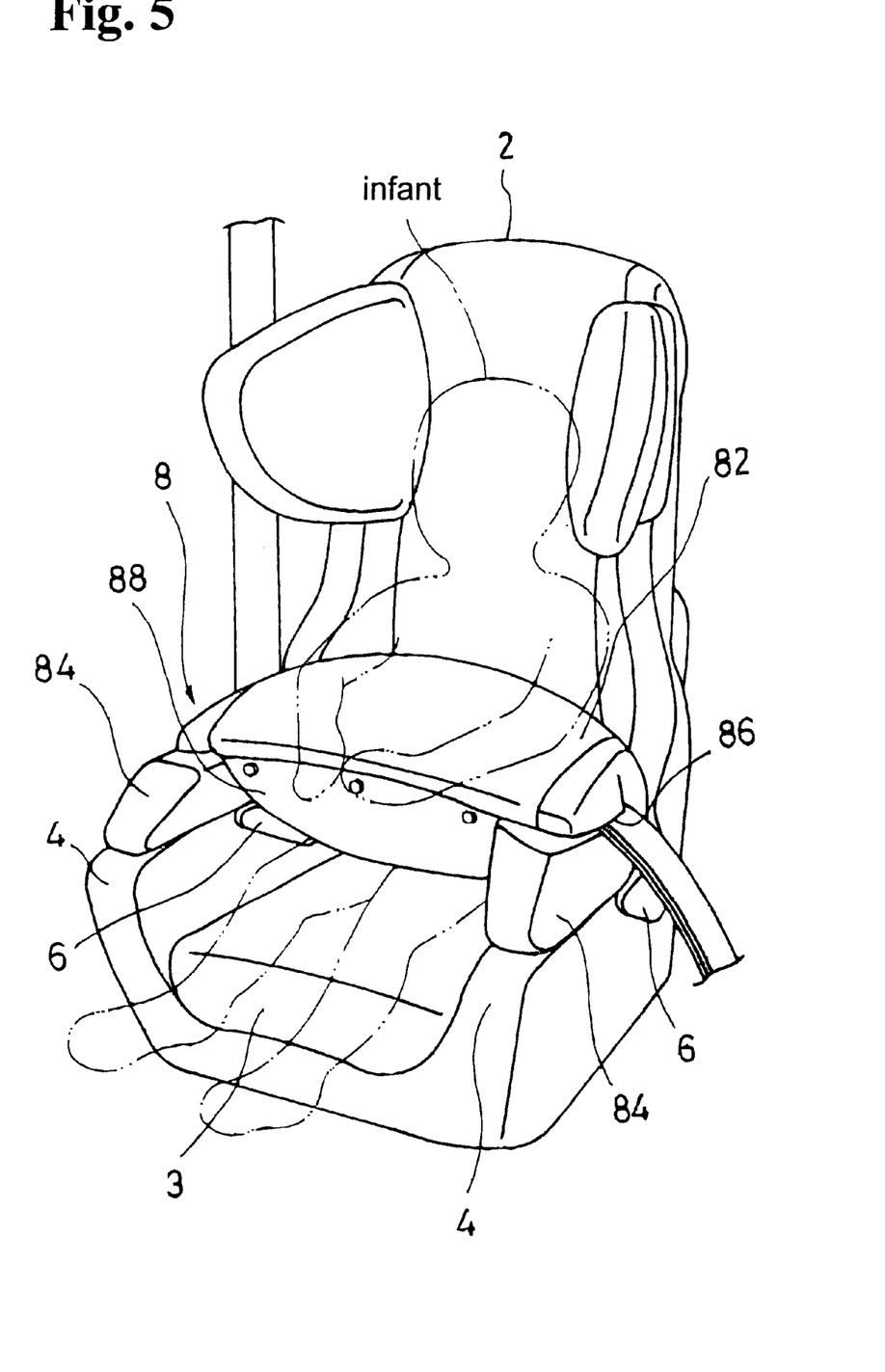
FIG. 5 is a perspective view showing the child seat according to the embodiment in the other using situation.
Figure 6:
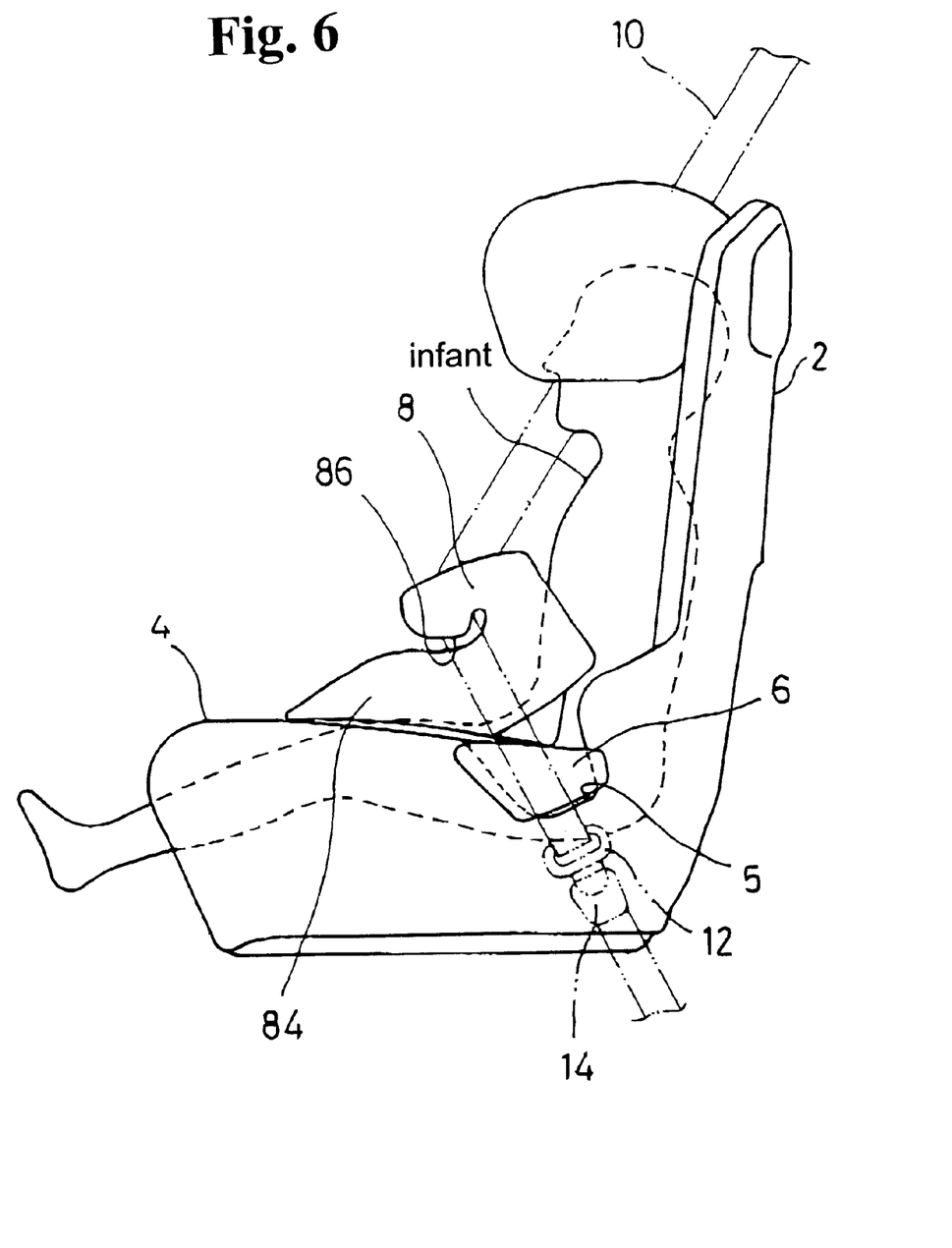
FIG. 6 is a side view of the child seat shown in FIG. 5.
Figure 7:
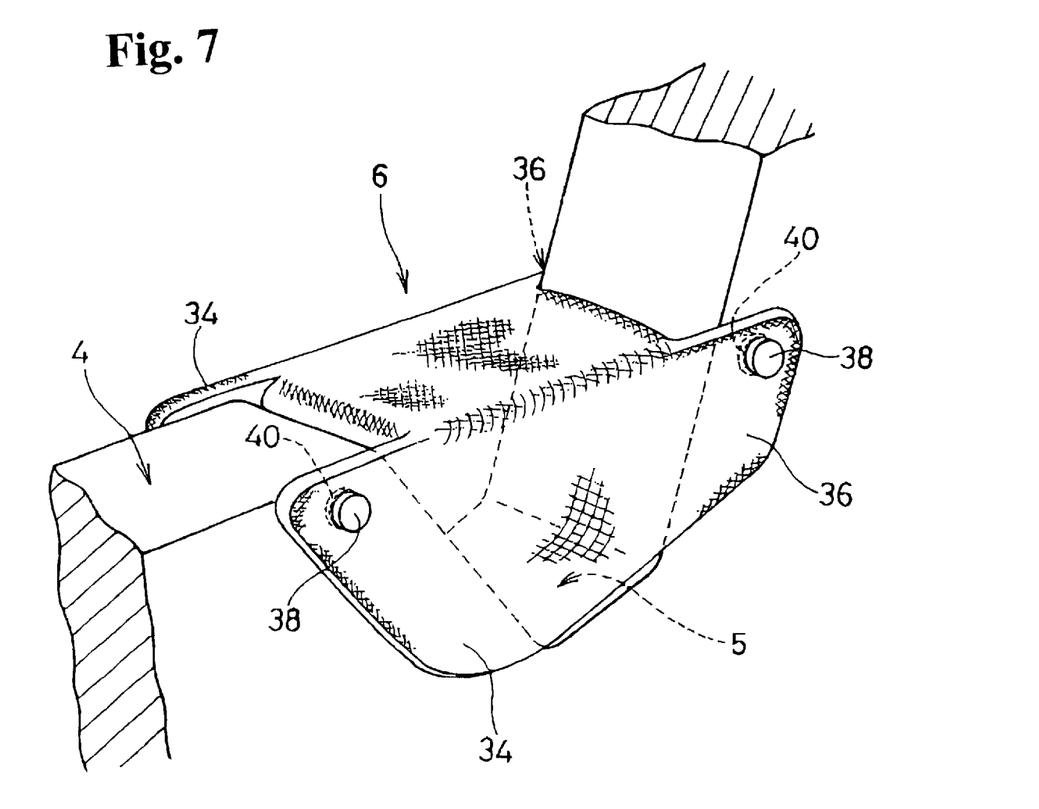
FIG. 7 is a perspective view of a portion of the child seat for illustrating the engagement between the child seat body and the fitting member.
Figure 8:
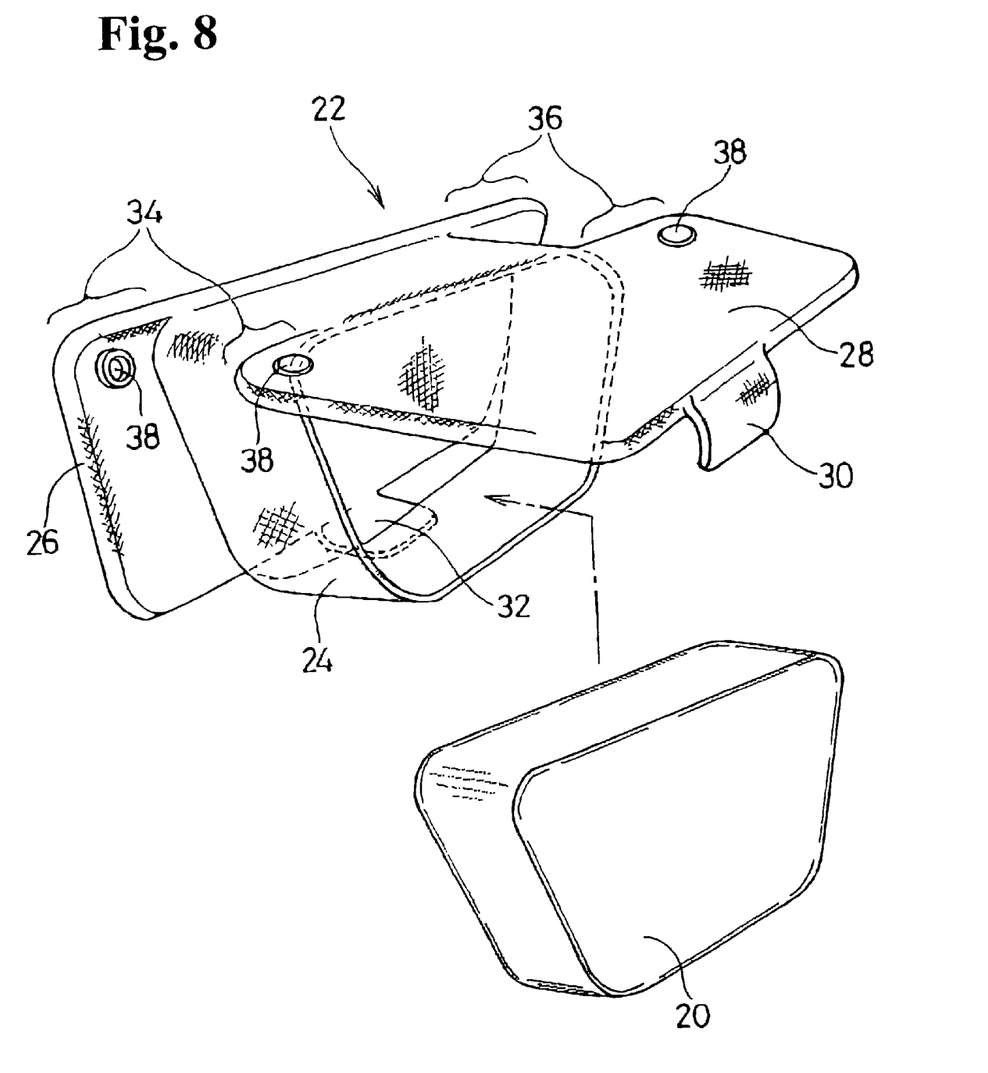
FIG. 8 is an exploded perspective view of the fitting member.

Hereinafter, embodiments of the present invention will be described with reference to the attached drawings. FIG. 1 is a perspective view of a child seat body of a child seat according to an embodiment of the present invention; FIG. 2 is a perspective view showing the child seat in one using situation; FIG. 3 is a side view of the child seat shown in FIG. 2; FIG. 4 is a perspective view showing the child seat body to which fitting members are attached; FIG. 5 is a perspective view showing the child seat in the other using situation; FIG. 6 is a side view of the child seat shown in FIG. 5; FIG. 7 is a perspective view for illustrating the engagement between the child seat body and the fitting member; and FIG. 8 is an exploded perspective view for illustrating the structure of the fitting member.

A child seat 1 comprises a child seat body 2 having securing means (not shown) relative to a vehicle seat, a squab portion 3 disposed at the front side of the child seat body 2 for seating an infant, and a pair of side walls 4 disposed on the right and left sides of the squab portion 3 and extending upwardly from the bottom of the child seat body 2. The child seat body 2 further includes a back portion 2a, a pair of side supports 2b, and a pair of upper supports 2c.

The side walls 4 have recessed portions 5, through which a seat belt 10 passes and extends downwardly from the top surfaces thereof, respectively.

The child seat 1 further comprises a pair of fitting members 6 having a size to fill the recessed portion 5 and which are detachably fitted in the recessed portions 5, and an impact shield 8 which is held by the seat belt 10.

As shown in FIG. 4, each fitting member 6 has a top surface substantially flush with the top of the side wall 4 to form a continuous flat top surface when it is fitted and fills the recessed portion 5. As shown in FIG. 7, each fitting member 6 has a pair of fins 34 and 36 disposed on the front side and the rear side of the fitting member 6, respectively. The pair of fins 34 and 36 sandwich a front-side end and a rear-side end of the side wall 4 facing the recessed portion 5, respectively, when the fitting member 6 is fitted in the recessed portion 5. Snap fasteners 38 are provided on the fins 34 and 36, and snap fasteners 40 are provided on the corresponding portions of the side wall 4, wherein the snap fasteners 38 and 40 are engaged with each other. The fitting member 6 is set to the recessed portion 5 in such a manner that the fins 34 and 36 sandwich the ends of the side wall 4, and the snap fasteners 38 on the fins are engaged with the snap fasteners 40 on the side wall 4, respectively, thereby securing the fitting member 6 to the side wall 4.

As shown in FIG. 8, each fitting member 6 comprises a cover 22 including the aforementioned fins 34, 36, and a filling member 20 inserted in the cover 22. The filling member 20 is a block-shaped member made of foamed synthetic resin. The cover 22 is normally made of the same material as a covering member of the child seat body, i.e. made of a fabric of polyester with a lining of urethane foam.

The cover 22 has a pocket portion 24 which holds the filling member 20 by surrounds the top, bottom, front and rear of the filling member 20, and a pair of flap-like side panels 26, 28 for closing the right and left sides of the pocket portion 24.

In this embodiment, the side panels 26, 28 include plate members, respectively, which are made of synthetic resin having a suitable hardness and elasticity as a reinforcing and retaining member, but there is no illustration of the members in the attached drawings. Front portions and rear portions of the side panels 26, 28 project from the front and the rear sides of the pocket portion 24 when the side panels 26, 28 close the sides of the pocket portion 24 so as to compose the aforementioned fins 34 and the fins 36.

Upper edges of the side panels 26, 28 are integrally connected to upper side edges of the pocket portion 24, whereby the side panels 26, 28 can pivot about the upper side edges so as to move apart from and close to the sides of the pocket portion 24. As the side plates 26, 28 pivot upwardly, the sides of the pocket portion 24 are opened, so that the filling member 20 can be inserted into or removed from the pocket portion 24. As the side plates 26, 28 pivot downwardly, the sides of the pocket member 24 are closed.

The side panels 26, 28 have tongue-like flexible attachments 30, 32 disposed on the bottoms thereof, respectively. The attachments 30, 32 are provided with hook-and-loop fasteners or touch fasteners such as pieces of Velcro (registered trademark). By superposing the attachments 30, 32 on each other when the side panels 26, 28 are disposed to close the sides of the pocket portion 24, the lower portions of the side plates 26, 28 are connected to each other through the attachments 30, 32.

The impact shield 8 is used for holding an infant seated on the squab portion 3 to the child seat body 2 by using the seat belt 10 together when the infant is too small to be sufficiently held to the child seat body 2 only by the seat belt 10. When it is used, the impact shield 8 is attached to a portion of the seat belt 10 touching an infant.

The impact shield 8 comprises a cushion portion 82 for protecting the infant by receiving the infant's body and absorbing an impact on the infant's body in the event of emergency, such as vehicle collision, and impact shield support members 84 which are disposed on the right and left sides of the impact shield 8 and are put on the tops of the side walls 4 for supporting the impact shield 8. It should be noted that a reference numeral 88 in FIG. 5 designates a cover for the front of the cushion portion 82.

The support members 84 are each provided with a groove 86 at an upper portion thereof through which the seat belt 10 of the vehicle is inserted. When using the impact shield 8, the portion of the seat belt 10 contacting the infant's body passes through the grooves 86 while setting the seat belt 10 to extend across the child seat body 2 and the squab portion 3.

Hereinafter, examples of using the child seat 1 having the aforementioned configuration will be described.

To use the child seat 1, first, the child seat body 2 is mounted to a vehicle seat (not shown) by using the aforementioned securing means (not shown). After making sure that the child seat body 2 is securely fixed to the vehicle seat, an infant is seated on the squab portion 3 of the child seat body 2.

When the infant has a relatively large-sized body, the seat belt 10 is set as follows. That is, the seat belt 10 is arranged to extend across the front of the child seat body 2 and the front of the infant seated on the squab portion 3, and then, a tongue 12 of the seat belt 10 is latched to a seat belt buckle 14 fixed to the vehicle body. As shown in FIG. 2 and FIG. 3, the seat belt 10 is laid on portions from the hip and chest to the shoulder of the infant.

After that, the portions of the seat belt 10 lying on the side walls 4 pass through the recessed portions 5 to make the seat belt 10 in close contact with the infant body. Accordingly, the infant's body can be held to the child seat body 2 directly by the seat belt 10.

When the body of the infant seated on the squab portion 3 is too small to be sufficiently held to the child seat body 2 only by the seat belt 10, as shown in FIG. 4, the fitting members 6 are fitted into the recessed portions 5 to fill the recessed portions 5, and the fitting members 6 are securely fixed to the side walls 4 as mentioned above. Then, the portion of the seat belt 10 to contact the infant's body is arranged to pass through and engage the grooves 86 formed in the front side of the impact shield 8. After that, the seat belt 10 is arranged to extend across the front of the child seat body 2 and the front of the infant, and then, the tongue 12 is latched to the buckle 14. As shown in FIG. 5 and FIG. 6, the impact shield 8 is placed to extend between the side walls 4 in such a manner that the support members 84 on the sides of the impact shield 8 are placed on the flat top surfaces of the side walls 4 where the fitting members 6 are fitted, respectively.

Finally, the impact shield 8 is moved to slide in the forward direction or the backward direction of the child seat body 2 along the top surfaces of the side walls 4 to adjust the position of the impact shield 8 such that the cushion portion 82 of the impact shield 8 lightly touches the waist to the chest of the infant. Accordingly, the infant's body is held to the child seat body 2 by the impact shield 8 and the seat belt 10.

As impact is exerted due to a vehicle collision during running of the vehicle while the infant is seated in the child seat body 2 and is held to the child seat 1 directly by the seat belt 10 or by the impact shield 8 and the seat belt 10, the infant's body rapidly moves forward relative to the seat so as to press the seat belt 10 directly or via the impact shield 8 in the forward direction. At this point, a seat belt retractor (not shown) connected to the seat belt 10 senses the sudden withdrawal of the seat belt 10 caused by the impact applied to the vehicle and/or the event that the infant's body presses the seat belt 10 in the forward direction and thus locks a reel (not shown) on which the seat belt 10 is wound to prevent the seat belt 10 from being withdrawn. Accordingly, the seat belt 10 or the impact shield 8 receives the infant's body and absorbs an impact on the infant's body.

When the infant's body is held to the child seat body 2 directly by the seat belt 10, since the portions of the seat belt 10 lying on the side walls 4 pass through the recessed portions 5, the seat belt 10 is caught by the side walls 4. Thus, there is no possibility of extending apart from the infant's body. Therefore, the seat belt 10 can closely contact the infant's body, thereby securely protecting the infant's body even in the event of emergency.

When the infant's body is held to the child seat body 2 by the seat belt 10 and the impact shield 8, the upper surfaces of the side walls 4 are formed flat because the fitting members 6 are fitted in the recessed portions 5, so that the impact shield 8 is placed on the flat top surfaces of the side walls 4. Therefore, the impact shield 8 can be stably supported by the side walls 4, thereby securely protecting the infant's body even in the event of emergency and providing good appearance when the impact shield is installed to the child seat.

Figure 9:
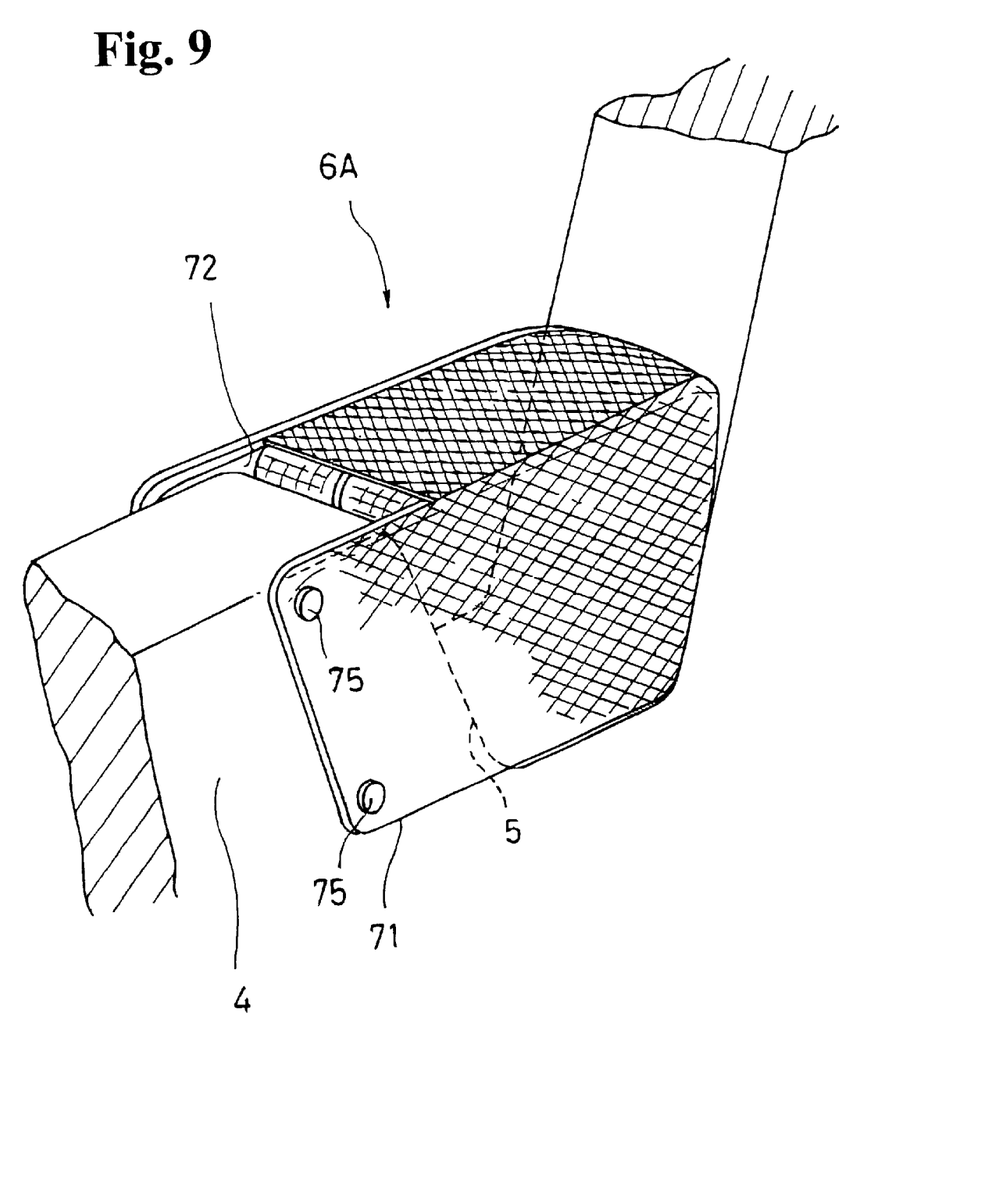
FIG. 9 is a perspective view showing the fitting member according to another embodiment in a state installed in the child seat.
Figure 10:
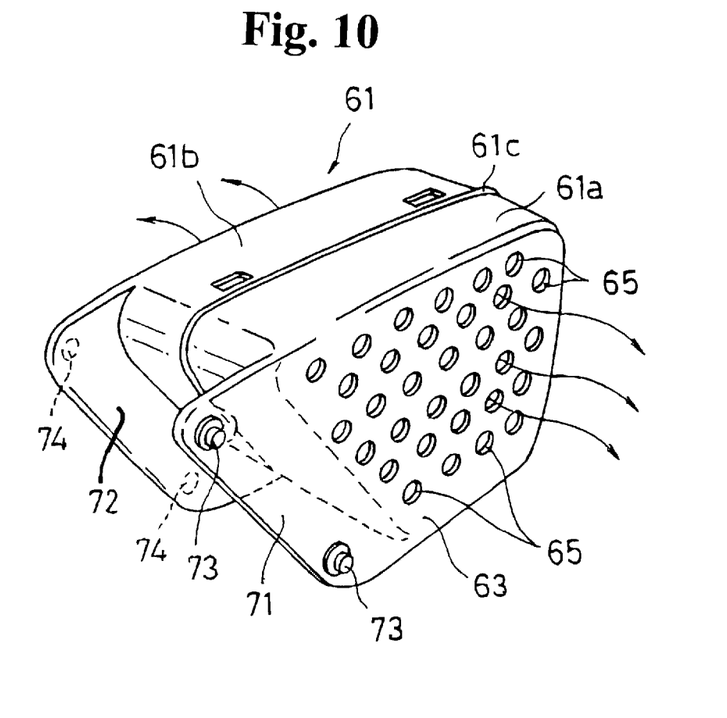
FIG. 10 is a perspective view showing a body portion of the fitting member shown in FIG. 9.
Figure 11:
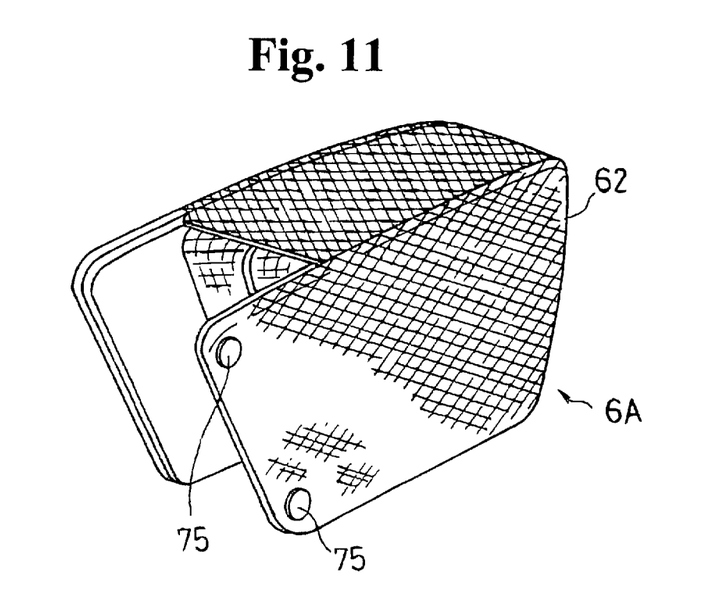
FIG. 11 is a perspective view showing the entire fitting member shown in FIG. 9.

It should be noted that the structure of the fitting member for filling the recessed portion in case of using the impact shield is not limited to the structure of the aforementioned embodiment. For example, a fitting member 6A shown in FIGS. 9 through 12 has a function of allowing air to flow between the squab portion side for the seating of the infant and the outside of the child seat body, in addition to the function of fixing the fitting member itself to the side wall. FIG. 9 is a perspective view showing the fitting member 6A in a state installed into the child seat body; FIG. 10 is a perspective view showing a body portion of the fitting member 6A; FIG. 11 is a perspective view showing the entire fitting member 6A; and FIG. 12 is a structural view of the body portion of the fitting member 6A.

The fitting member 6A comprises a fitting member body 61 and a cover 62 for covering the fitting member body 61. The fitting member body 61 has a left half 61a and a right half 61b which are connected by a hinge portion 61c. The fitting member body 61 is made of synthetic resin, so that the left half 61a, the right half 61b, and the hinge portion 61c are integrally formed.

Figure 12:
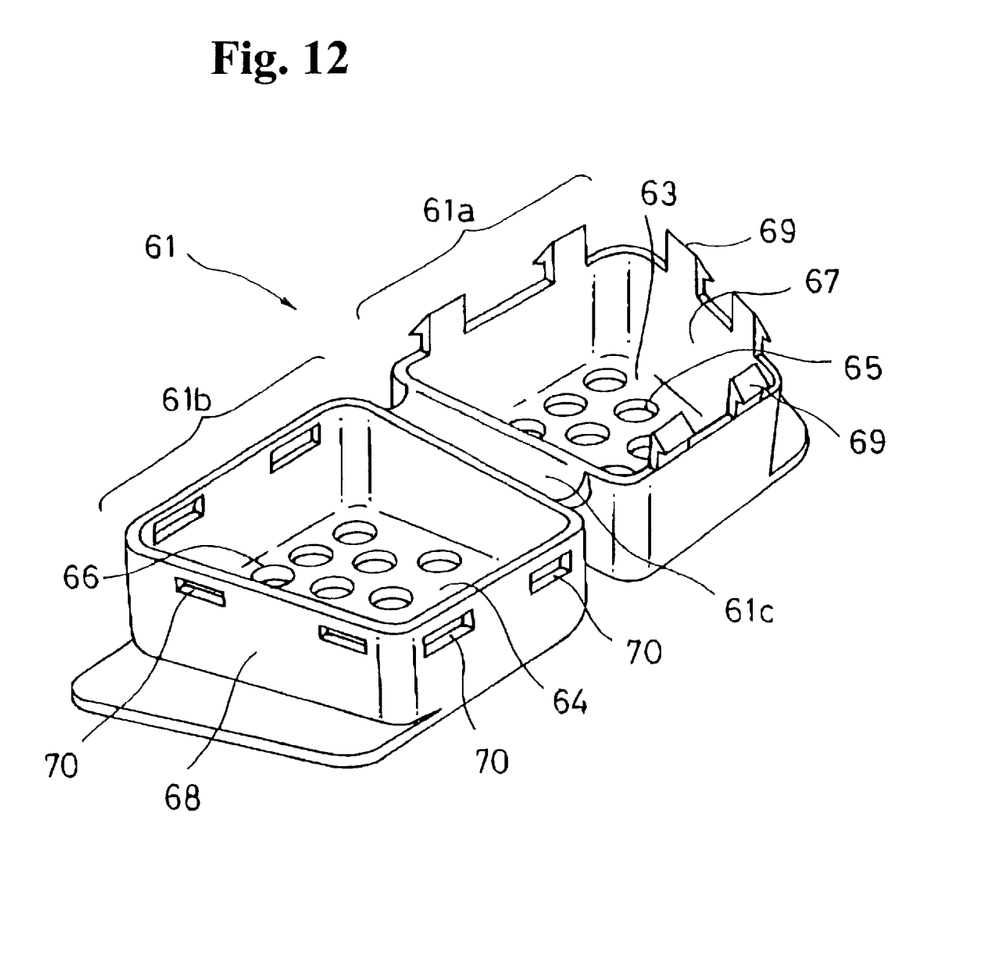
FIG. 12 is a structural view of the body portion of the fitting member shown in FIG. 9.

As shown in FIG. 12, the left half 61a and the right half 61b have panels 63 and 64 composing the left and right side walls of the fitting member body 61, respectively. The panels 63, 64 are provided with vent holes 65, 66 forming through holes, respectively. The left half 61a and the right half 61b also have surrounding walls 67, 68 which stand on the peripheral portions of the panels 63, 64 to extend all around the panels 63, 64. Respective edges of the top surfaces of the surrounding walls are connected by the hinge portion 61c. The left half 61a and the right half 61b are configured in symmetrical relation about the hinge portion 61c.

To assemble the fitting member body 61, the left half 61a and the right half 61b are swung about the hinge portion 61c to bend the hinge portion 61c, so that the peripheral edges of the surrounding walls 67, 68 of the left half 61a and the right half 61b are superposed on each other. At this point, pawls 69 projecting from the peripheral edge of the surrounding wall 67 of the left half 61a are engaged with engaging holes 70 formed in portions near the peripheral edge of the surrounding wall 68 of the right half 61b, whereby the left half 61a and the right half 61b are connected. In this manner, the fitting member body 61 as shown in FIG. 10 is assembled.

The fitting member body 61 assembled in the above manner has a hollow box-like shape. The vent holes 65, 66 formed in the left and right panels 63, 64 communicate with each other through the hollow portion inside the fitting member 61.

As shown in FIG. 10, the front portion of the fitting member body 61 has a pair of plate-like fins 71, 72 projecting forward as extensions of the left and right panels 63, 64 and disposed for sandwiching an end portion facing the recessed portion 5 of the side wall 4. The distance between the inner surfaces of the fins 71, 72 facing each other is substantially equal to the thickness of the side wall 4. The outer surfaces of the fins 71, 72 are flush with the surfaces of the panels 63, 64, respectively. Snap fasteners 73, 74 for connecting the cover 62 are provided on the outer surfaces of the fins 71, 72.

The cover 62 is placed over the fitting member body 61 to cover the whole surface of the fitting member body 61. The cover 62 is fixed to the fitting member body 61 by engaging snap fasteners 75, 76 (the snap fasteners 76 are not shown) provided on the cover 62 with the snap fasteners 73, 74 of the fitting member body 61. The cover 62 is made of a material having excellent permeability, such as mesh-like knitted fabric or woven fabric. Therefore, the fitting member 6A allows air to pass between the left side and the right side thereof through the cover 62 and the vent holes 65, 66 of the fitting member body 61.

The fitting member 6A having the above structure is fitted in the recessed portion 5 to fill the recessed portion, as shown in FIG. 9 when the impact shield 8 is used. In this state, the fins 71, 72 projecting from the front of the fitting member 6A sandwich the end portion of the side wall facing the recessed portion 5, thus preventing the fitting member 6A from coming off the recessed portion 5 due to the movements of the running vehicle and the infant. The left and right side walls of the fitting member 6A are arranged to be substantially flush with the inner surface of the side wall 4 facing the squab portion 3 and substantially flush with the outer surface of the side wall 4 facing the outside of the child seat body 2, respectively.

Since the fitting member 6A allows air to pass between the squab portion 3 and the outside of the child seat body 2 through the cover 62 and the vent holes 65, 66, the infant may not feel uncomfortable even when the impact shield is placed on the side walls 4 to shield the front of the child seat.

The fitting member 6 or 6A may have a configuration common to the left and right recessed portions and may have a configuration exclusive for either one of the left and right recessed portions.

As described above, the child seat of the present invention ensures the seat belt to be introduced in close contact with an infant's body when the infant is held directly by the seat belt. In addition, the child seat has a good appearance even when the impact shield is attached to the seat belt and is installed to the child seat, and the child seat has excellent stability for the impact after installation.

While the invention is explained with reference to the specific embodiments of the invention, the explanation is illustrative and the invention is limited only by the appended claims.

What is claimed is:

1. A child seat to be secured to a vehicle seat, comprising:
    a squab portion for allowing an infant to be seated thereon having a rear portion and left and right sides,
    a seat back extending upwardly from the rear portion of the squab portion,
    two side support portions formed at side portions of the seat back to extend in a front direction,
    two side walls disposed on the left and right sides of said squab portion, each side wall having a first fastener, and a top surface,
    two recessed portions, each recessed portion being formed between one of the side walls and one of the side support portions adjacent thereto and extending obliquely downwardly from the top surface toward the rear portion of the squab portion for allowing, in one situation, a seat belt installed in a vehicle primarily for use by an adult to pass therethrough, and
    two separate fitting members detachably attached to the side walls for filling said recessed portions, each fitting member having a top surface and a second fastener engageable with the first fastener so that when the fitting member is attached to the side wall to fill the recessed portion, the first and second fasteners are fastened together and the top surfaces of the side wall and the fitting member become substantially flush with each other.

2. A child seat according to claim 1, wherein each of the fitting members includes a fitting member body, and a cover for covering the fitting member body.

3. A child seat according to claim 1, wherein each of said recessed portions extends to a portion close to a junction between the seat back and the squab portion.

4. A child seat according to claim 3, further comprising upper support portions fixed to the seat back above the side support portions, and an impact shield to be placed on the side walls and adapted to be attached to the seat belt.

5. A child seat according to claim 1, further comprising an impact shield to be placed on the side walls and adapted to be attached to the seat belt.

6. A child seat according to claim 1, wherein each of said side walls has inner and outer surfaces, said inner and outer surfaces becoming substantially flush with inner and outer surfaces of each of the fitting members attached thereto.

7. A child seat according to claim 6, wherein each of said fitting members includes one pair of front fins for holding a part of the side wall therebetween.

8. A child seat according to claim 7, wherein each of said fitting members further includes one pair of rear fins for holding a part of the side support portions therebetween.

9. A child seat according to claim 8, wherein said first fastener is snap fasteners formed on the front and rear fins, and said second fastener is snap fasteners formed on the side walls and the side support portions.

10. A child seat to be secured to a vehicle seat, comprising:
    a squab portion for allowing an infant to be seated thereon,
    side walls disposed on left and right sides of said squab portion, and having top surfaces and recessed portions extending downwardly from the top surfaces for allowing, in one situation, a seat-belt installed in a vehicle primarily for use by an adult to pass therethrough, and
    fitting members detachably attached to the side walls for filling said recessed portions, each of said fitting members having a fitting member body with a plurality of small holes to allow air to pass therethrough, and a cover for covering the fitting member body.

* * * * *